US006243507B1

United States Patent
Goldstein et al.

(10) Patent No.: US 6,243,507 B1
(45) Date of Patent: Jun. 5, 2001

(54) CONNECTION-VERIFICATION IN OPTICAL MEMS CROSSCONNECTS VIA MIRROR-DITHER

(75) Inventors: Evan Lee Goldstein, Princeton; Lih-Yuan Lin, Middletown; Leda Maria Lunardi, Marlboro, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/472,682

(22) Filed: Dec. 27, 1999

Related U.S. Application Data

(60) Provisional application No. 60/137,840, filed on Jun. 7, 1999.

(51) Int. Cl.[7] ..................................................... G02B 6/12
(52) U.S. Cl. ................................ 385/13; 385/17; 385/18; 385/19
(58) Field of Search .......................... 385/16–19, 12–14; 359/212, 223, 225; 250/216, 234

(56) References Cited

U.S. PATENT DOCUMENTS

| | | | |
|---|---|---|---|
| 5,136,671 | 8/1992 | Dragone | 385/46 |
| 5,155,623 | 10/1992 | Miller et al. | 359/495 |
| 5,206,497 | 4/1993 | Lee | 250/201.1 |
| 5,960,132 | 9/1999 | Lin | 385/18 |
| 6,144,781 | * 11/2000 | Goldstein et al. | 385/18 |

OTHER PUBLICATIONS

H. Toshiyoshi et al., "Electrostatic Micro Torsion Mirrors for an Optical Switch Matrix," *Journal of Microelectromechanical Systems*, vol. 5, No. 4, Dec. 1996, pp. 231–237.
B. Behin et al., "Magnetically Actuated Micromirrors for Fiber–Optic Switching," Solid–State Sensor and Actuator Workshop, Hilton Head, South Carolina, Jun. 8–11, 1998, pp. 273–276.
K. S. J. Pister et al., "Microfabricated Hinges," *Sensors and Actuators*, vol. A, No. 33 (1992), pp. 249–256.
T. Akiyama et al., "A Quantitative Analysis of Scratch Drive Actuator Using Buckling Motion," *IEEE Workshop on Micro Electro Mechanical Systems*, Amsterdam, The Netherlands, Jan. 29–Feb. 2, 1995, pp. 310–315.
R. T. Chen et al., "A Low Voltage Micromachined Optical Switch By Stress–Induced Bending," $12^{th}$ IEEE International Conference On Micro Electro Mechanical Systems, Orlando, Florida, Jan. 17–21, 1999, 5 pages.
Cronos Integrated Microsystems, Inc., "Three–Layer Polysilicon Surface Micromachine Process," Aug. 24, 1999, pp. 1–8 (http://mems.mcnc.org).
L. Y. Lin et al., "Free–Space Micromachined Optical Switches for Optical Networking," *IEEE Journal of Selected Topics in Quantum Electronics*, vol. 5, No. 1, Jan./Feb. 1999, pp. 4–9.

(List continued on next page.)

*Primary Examiner*—Darren Schuberg
*Assistant Examiner*—Fayez Assai

(57) ABSTRACT

Integrated connection-verification system for use in a micro-electro-mechanical system (MEMS) crossconnect device. The system uses application of a dithering signal such as a sinusoidal bias to an electrode plate associated with a micro-mirror switching element to dither the micro-mirror. The optical signal from the dithering micro-mirror is fed through a beam splitter, a portion of the optical signal thus being directed to a photodetector. If intensity modulation in the optical signal corresponding to the frequency of the dithering signal is detected by the photodetector associated with the micro-mirror, the connection path between the desired input and output ports is verified.

11 Claims, 9 Drawing Sheets

OTHER PUBLICATIONS

L. Y. Lin et al., "High–Density Micromachined Polygon Optical Crossconnects Exploiting Network Connection–Symmetry," *IEEE Photonics Technology Letters,* vol. 10, No. 10, Oct. 1998, pp. 1425–1427.

E. L. Goldstein et al., "National–Scale Networks Likely to Be Opaque," *Lightwave,* Feb. 1998, pp. 91–95.

C–K. Chan et al., "A Novel Optical–Path Supervisory Scheme for Optical Cross Connects in All0Optical Transport Networks," *IEEE Photonics Technology Letters,* vol. 10, No. 6, Jun. 1998, pp. 899–901.

L. Y. Lin et al., "Optical Cross–connect Integrated Systesm (OCCIS): A Free–Space Micromachined Module for Signal and Switching Configuration Monitoring," *IEEE LECS Summer Topical Meeting: Optical MEMS,* Monterey, California, Jul. 20–22, 1998, 3 pages.

* cited by examiner

CONNECTION-VERIFICATION IN OPTICAL MEMS CROSSCONNECTS VIA MIRROR-DITHER

This nonprovisional application claims the benefit of U.S. Provisional Application No. 60/137,840, filed Jun. 7, 1999.

BACKGROUND OF THE INVENTION

1. Field of Invention

This invention relates to a connection verification system in an optical micro-electro-mechanical system (MEMS) crossconnect device.

2. Description of Related Art

Optical crossconnects (OXCs) have emerged as a promising means of carrying out optical-layer provisioning and restoration in future, high-capacity WDM (wavelength-division multiplexing) networks.

As technologies for optical switching advance, enhancing the networking functionality of OXCs has become increasingly important, and doing so via integrated and low-cost approaches becomes particularly desirable. One important requirement for the OXC is connection-verification for network surveillance. That is, it is desired to verify that an optical signal is being properly switched and carried within the system to the desired output port or fiber.

What is still desired is a simple, cost-effective connection verification system for use in a MEMS optical crossconnect network.

SUMMARY OF THE INVENTION

It is therefore an object of the invention to develop a connection path verification system for use in the MEMS OXC.

This and other objects are achieved by the present invention that achieves connection path verification via integrated pilot-tone coding schemes utilizing micro-mirror dithering in the MEMS crossconnect.

In one aspect of the invention, the invention relates to a connection verification system comprising a micro-mirror having an optical signal input side and an optical signal output side, the micro-mirror connected to a substrate, an electrode plate in association with the micro-mirror and capable of dithering the micro-mirror upon application of a dithering signal to the electrode plate, a beam splitter located on the substrate at the optical signal output side of the micro-mirror, and a photodetector positioned beneath the beam splitter.

In a further aspect of the invention, the invention relates to a connection verification system of an optical micro-electro-mechanical crossconnect device, comprising at least one input port and at least one output port, a micro-mirror having an optical signal input side and an optical signal output side, the micro-mirror connected to a substrate, the micro-mirror being positioned on the substrate at a 45° angle to an incoming optical signal from one of the at least one input ports and at a point of intersection of a path from the one input port and one of the at least one output ports, an electrode plate in association with the micro-mirror and capable of dithering the micro-mirror upon application of a dithering signal to the electrode plate, a beam splitter located on the substrate at the optical signal output side of the micro-mirror, and a photodetector positioned beneath the beam splitter.

In a still further aspect of the invention, the invention relates to a method of verifying the connection path of an optical signal from an input port to a desired output port, comprising switching an optical signal from the input port to the desired output port with a micro-mirror having an optical signal input side and an optical signal output side, the micro-mirror connected to a substrate, applying a dithering signal to an electrode plate in association with the micro-mirror to dither the micro-mirror, and splitting the optical signal on the optical signal output side of the micro-mirror into a detection portion and an output portion with a beam splitter located on the substrate at the optical signal output side of the micro-mirror, the beam splitter directing the detection portion of the optical signal to a photodetector located beneath the beam splitter. The connection path is verified when the photodetector detects alterations in intensity of the detection portion of the optical signal corresponding to the dithering signal applied to the electrode plate.

BRIEF DESCRIPTION OF THE DRAWINGS

FIGS. 6–9 are frequency responses of the micro-mirror at various frequencies and biases, while

DETAILED DESCRIPTION OF PREFERRED EMBODIMENTS

Figure 1:
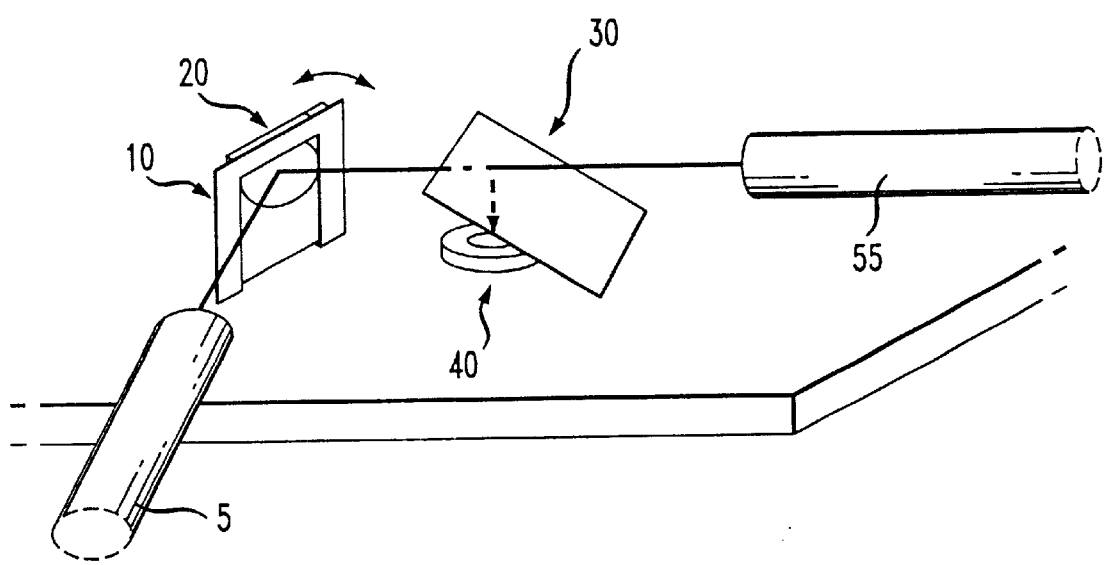
FIG. 1 is an illustration of the mirror-dither scheme for pilot-tone coding and on-chip signal monitoring in the free-space MEMS OXC of the invention.

In a conventional network, there is access to the bit streams traveling within the system. This enables easy manipulation of a bit stream, for example by turning signals on and off to represent bits, in order to verify that the bit stream is being switched to the proper output port. The methodology was simple and straightforward.

However, this conventional technology cannot be utilized in optical crossconnect systems because access to the system as in the conventional technology is not available. That is, in conventional electronic systems, information can be manipulated at the bit level because of the devices used in such a system. However, in optical crossconnect systems, the equipment includes lenses, etc., that do not afford manipulation of bits. As a result, it is not possible in optical crossconnect systems to look at information bits and determine therefrom what they are connected to. Thus, new connection verification technology must be developed in order to confirm that the switches within the optical crossconnect are properly connecting an input optical signal to the desired output port.

An optical path supervisory scheme has been proposed in C.-K. Chan, E. Kong, F. Tong and L.-K. Chen, "A Novel Optical-Path Supervisory Scheme For Optical Cross Connects In All-Optical Transport Networks", IEEE Photonics Tech. Lett., vol. 10, pages 899–901 (1998). In this scheme, use is made of periodic characteristics of arrayed-waveguide-gratings. Although adequate, this scheme is cumbersome in terms of the hardware required. The scheme requires a specific arrayed-waveguide grating and requires additional filters to be used.

Micro-electro-mechanical system (MEMS) technology, due to its unique capability of integrating optical, electrical and mechanical elements on a single chip, holds strong advantages for implementing multiple functionalities in integrated form.

Free-space MEMS optical switches aiming at large-scale switch fabrics have been demonstrated using various approaches. See, for example, (1) H. Toshiyoshi and H. Fujita, "Electrostatic Micro Torsion Mirrors for an Optical Switch Matrix", J. Microelectromechanical Systems, vol. 5, no. 4, pp. 231–237, 1996, (2) L. Y. Lin, E. L. Goldstein, and R. W. Tkach, "Free-Space Micromachined Optical Switches for Optical Networking", IEEE J. Selected Topics in Quantum Electronics: Special Issue on Microoptoelectromechanical Systems (MOEMS), vol. 5, no. 1, pp. 4–9, 1999, (3) L. Y. Lin, E. L. Goldstein, J. M. Simmons, and R. W. Tkach, "High-Density Micromachined Polygon Optical Crossconnects Exploiting Network Connection Symmetry", IEEE Photonics Tech. Lett., vol. 10, pages 1425–1427 (1998), (4) R. T. Chen, H. Nguyen, and M. C. Wu, "A Low Voltage Micromachined Optical Switch by Stress-Induced Bending", 12th IEEE International Conference on Micro Electro Mechanical Systems, Orlando, Fla., Jan. 17–21, 1999, and (5) B. Behin, K. Y. Lau, and R. S. Muller, "Magnetically Actuated Micromirrors for Fiber-Optic Switching", Solid-State Sensor and Actuator Workshop, Hilton Head Island, S.C., Jun. 8–11, 1998, each incorporated by reference herein in their entireties.

U.S. Pat. No. 5,960,132 describes an optical switch device that is actuated between reflective and non-reflective states. U.S. application No. 09/472/724 entitled "Angular-Precision Enhancement In Free-Space Micromachined Optical Switches" and based on Provisional Application No. 60/137, 838 (filed Jun. 7, 1999), describes free-space MEMS cross-connect optical switches that include mechanical angular alignment enhancement structures. This patent and co-pending application are both incorporated herein by reference in their entireties. The present invention may utilize the optical switches described in the 132 patent and/or the co-pending application, with or without the additional mechanical angular alignment enhancement structures of the co-pending application. Of course, any other suitable switch mirror scheme may also be used.

In free-space MEMS crossconnects, micromachined mirrors are utilized as the switching elements. These may be, for example, free-rotating mirrors as just discussed.

Optical switches function to switch an optical signal from an input port 5, e.g., an input fiber, to an output port 55, e.g., an output fiber when in the reflective position. The switches are located within an open, free space. The size of the matrix of incoming and outgoing fibers is N×M, with N and M being any integer greater than 1. Optical micro-mirror switching elements are typically positioned at a 45° angle to the direction of an incoming optical beam from an input port in matrix configuration, and located at the points of intersection of the paths of each input port and each output port. Incoming optical beams may be directed to the desired output port through use of the micro-mirror optical switches. Other configurations, for example polygonal, are possible.

When an incoming optical signal is not to be redirected by a particular micro-mirror, the micro-mirror remains in its rest position, which is horizontal to the substrate upon which the micro-mirror is mounted, or at least out of the plane of travel of the optical signal. However, if an optical signal is to be redirected by the micro-mirror, the micro-mirror is moved/raised to its reflective position, which is a predetermined position and preferably is, for example, as close to perpendicular, i.e., 90°, from the substrate as possible.

The micro-mirrors of the invention may be made of any conventional material. For example, the micro-mirrors may be polysilicon, optional coated with a highly reflective metal such as gold or Cr/Au, for example as in H. Toshiyoshi and H. Fujita, supra.

The micro-mirror, hinge and staple may be formed by any conventional process. The micro-mirrors are preferably formed by surface-micromachining, for example as in the well-known MUMPs™ (the multi-user MEMS) process described in, for example, L. Y. Lin, E. L. Goldstein and R. W. Tkach, "Free-Space Micromachined Optical Switches for Optical Networking", IEEE Journal of Selected Topics in Quantum Electronics, vol. 5, no. 1, pp. 4–9, January/February 1999 and K. S. J. Pister, M. W. Judy, S. R. Burgett, and R. S. Fearing, "Microfabricated Hinges," Sensors and Actuators A, vol. 33, pp. 249–256, 1992, both incorporated herein by reference in their entireties. In MUMPs™, a polysilicon is used as the structural material, a deposited oxide (PSG) is used for the sacrificial layers, and silicon nitride is used as an electrical isolation layer between the silicon substrate and the polysilicon layers. The polysilicon layers are referred to as poly-0, poly-1 and poly-2.

Figure 2:
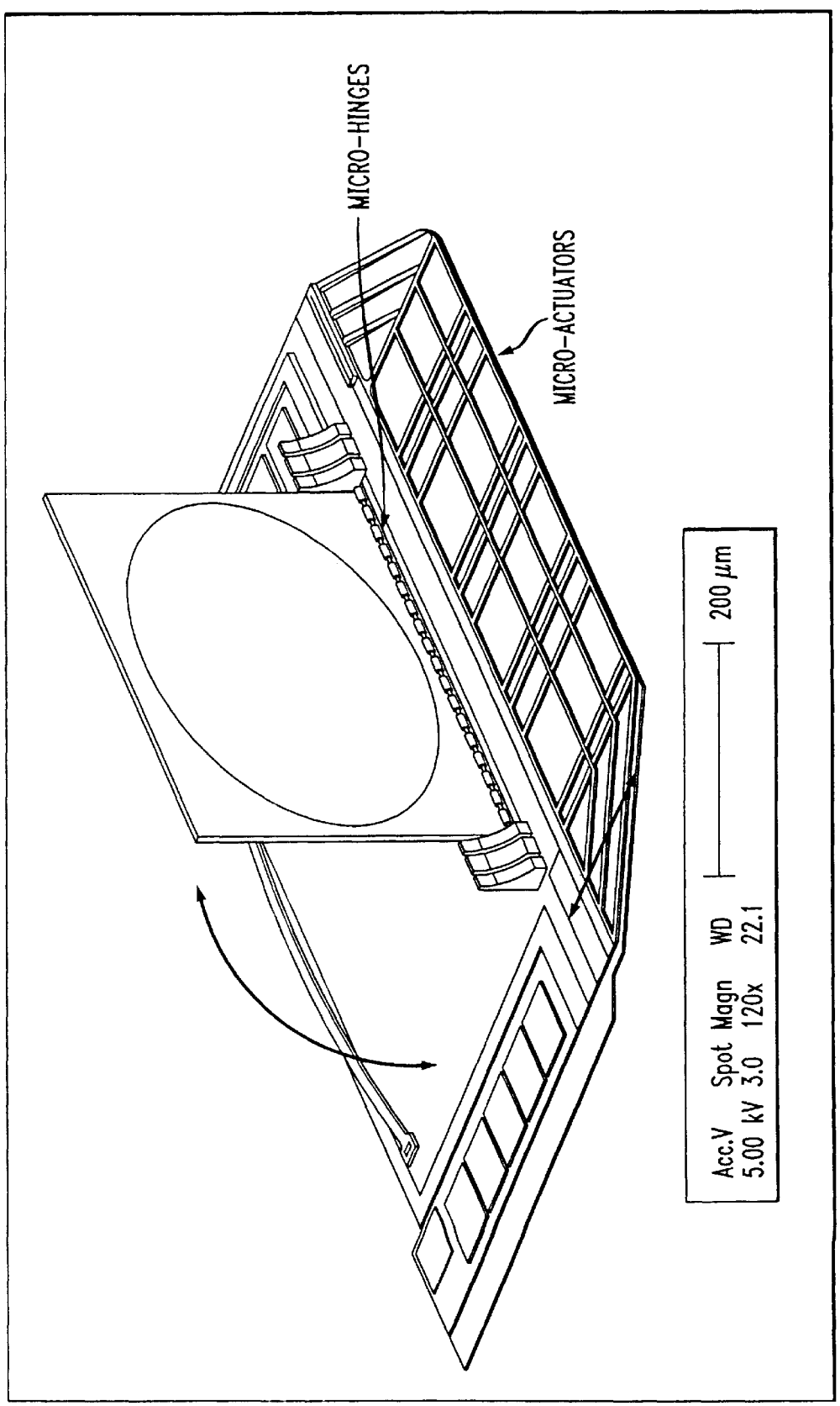
FIG. 2 is a SEM (scanning electron microscope) photograph of a free-rotating hinged micro-mirror in a free-space MEMS OXC of the invention.
Figure 3:
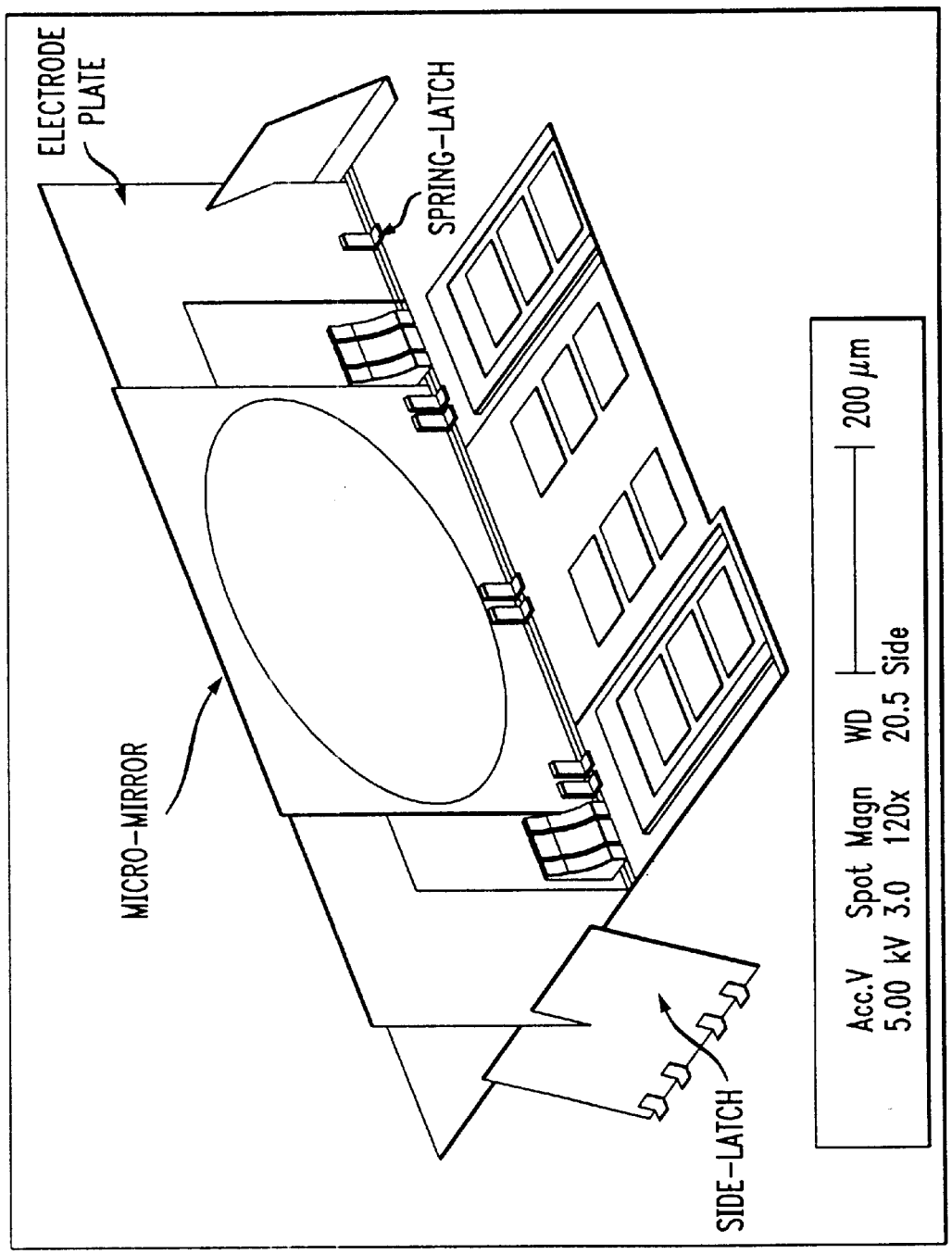
FIG. 3 is a SEM photograph of the micro-switch mirror with an integrated electrode.
Figure 4:
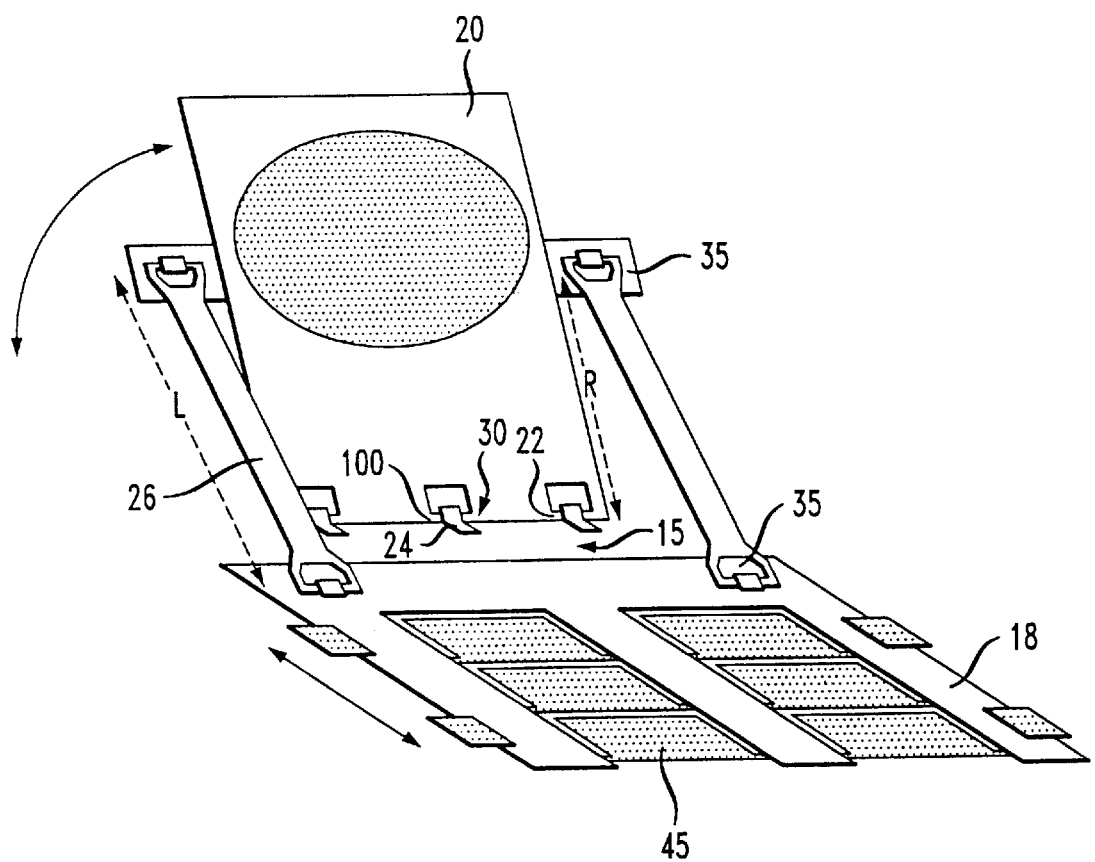
FIG. 4 is a schematic diagram of a microactuated free-rotating switch mirror.

FIGS. 2, 3 and 4 show a preferred mirror switch of the invention. The micro-mirror 20 is mounted within a frame, which frame is connected to the substrate 15 by free-rotating micro-hinges 30. The hinges 30 include one or more hinge pins 22 and one or more hinge staples 24. Pushrods 26 are connected at one end to the mirror (mirror frame) and at the opposite end to the translation stage 18.

Scratch-drive actuators (SDAs) 45 are preferably employed to move the translation stage. SDAs are conventional, and thus an extensive discussion of the function of the SDAs is not necessary herein. For a discussion of the formation and function of SDAs see, for example, T. Akiyama and H. Fujita, "A Quantitative Analysis of Scratch Drive Actuator Using Buckling Motion," in IEEE Workshop on Micro Electro Mechanical Systems, Amsterdam, the Netherlands, Jan. 29–Feb. 2, 1995, incorporated herein by reference in its entirety. For purposes of explaining the functioning of the hinged micro-mirrors of the present invention, it is sufficient to note that through application of an appropriate voltage to the SDA, the SDA can be deformed or moved to a certain extent, which deformation or movement is used to move the translation stage a translation distance corresponding to the extent of deformation. Movement of the translation stage in turn causes the pushrods to act upon the mirror frame and rotate it up to a predetermined position or angle from the substrate, typically the 90° position discussed above.

FIG. 1 shows the micro-mirror dither scheme for pilot-tone coding and on-chip signal monitoring in the free-space MEMS OXC of the invention. In this scheme, an electrode plate 10 is associated with the micro-mirror 20.

The electrode plate is made of any suitable material. Preferably, the electrode plate is also a surface-micromachined polysilicon integrally formed during the MUMPs process. In this way, the electrode plate can be formed with the micro-mirror. The electrode plate may be formed from, for example, the poly-1 layer. The electrode plate may be integral with the micro-mirror, or it may be formed to separately more, for example rotate via hinge joints, the same as the micro-mirror.

As the electrode plate is preferably made of polysilicon, it is conductive. The electrode plate contacts the polysilicon hinge staples. A source providing the dithering signal to the electrode plate can be connected via conductive, e.g., polysilicon or gold, wiring to either the electrode plate or the hinge staples. The conductive wiring is also preferably formed photolithographically during the MUMPs formation process.

Although the electrode plate is illustrated in FIG. 1 to extend around the exterior of the micro-mirror, any suitable configuration of the electrode plate can be used. The only requirement is that the electrode plate must be capable of dithering the micro-mirror when a dithering signal is applied to the electrode plate.

At the 90° position, i.e., the vertical, reflective or active switch position, the micro-mirror can perform small angle modulation under external force. That is, the micro-mirror can be made to vary slightly in angle from its designed position to the incoming optical signal, e.g., 90° to the incoming optical signal. The direction of modulation is shown in FIG. 1.

Dithering, i.e., repetitive, back-and-forth small angle modulation, of the micro-mirror is effected in the invention through application of a dithering signal to the electrode plate. The only requirement of the dithering signal is that it must be capable of inducing small angular variations in the micro-mirror which can be detected by a photodetector. The dithering signal may be, for example, a sinusoidal bias or a sinusoidal pilot tone. Most preferably, the dithering signal is a sinusoidal bias. A sinusoidal bias causes the micro-mirror to dither at frequencies corresponding to the sinusoidal bias.

Figure 5:
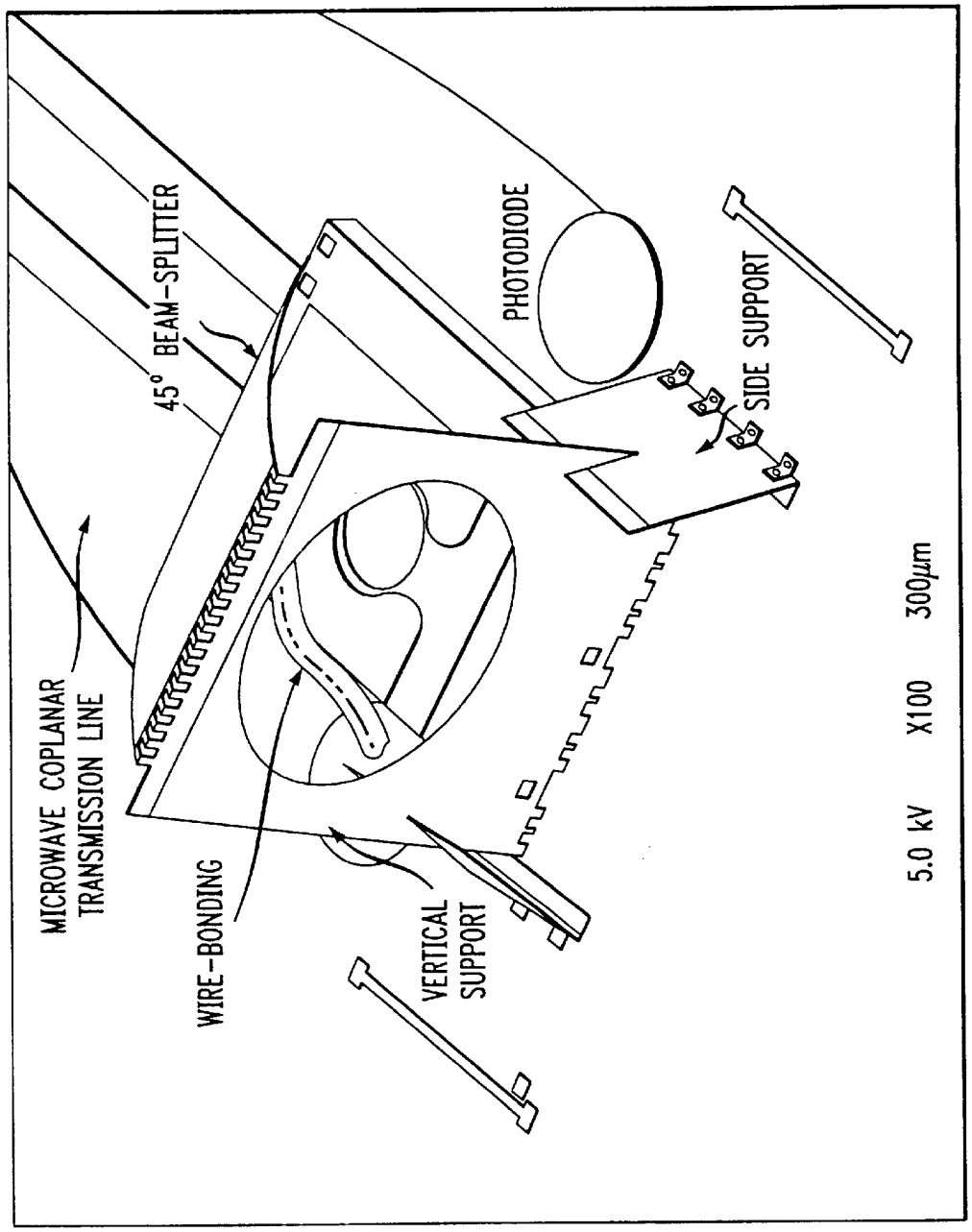
FIG. 5 is a SEM photograph of the beam-splitter/photodetector monitor module of the invention.
Figure 6:
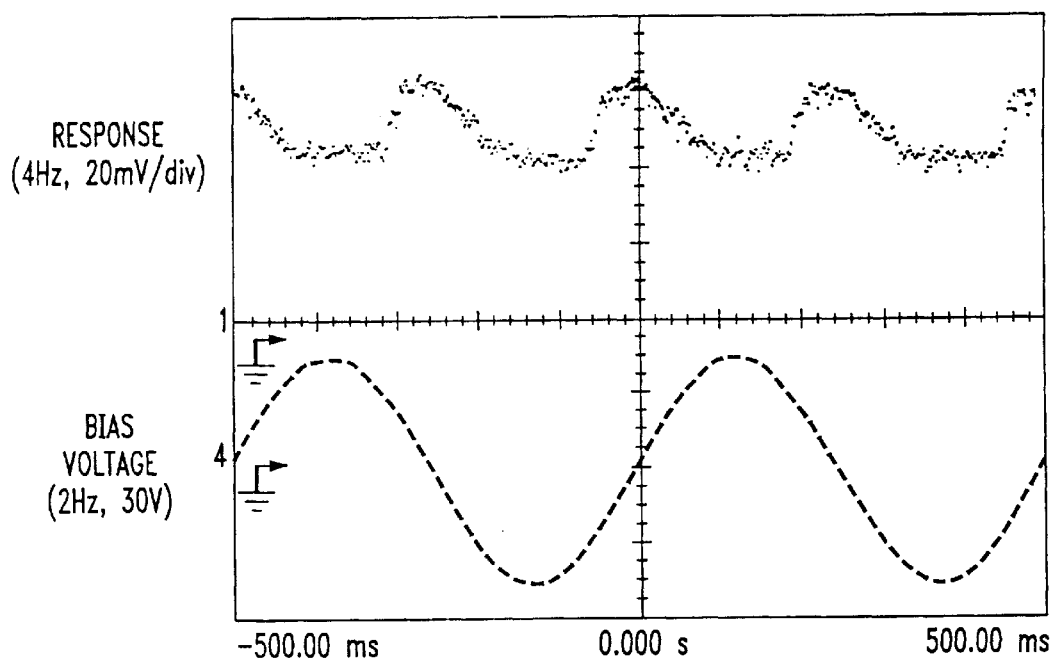
Figure 7:
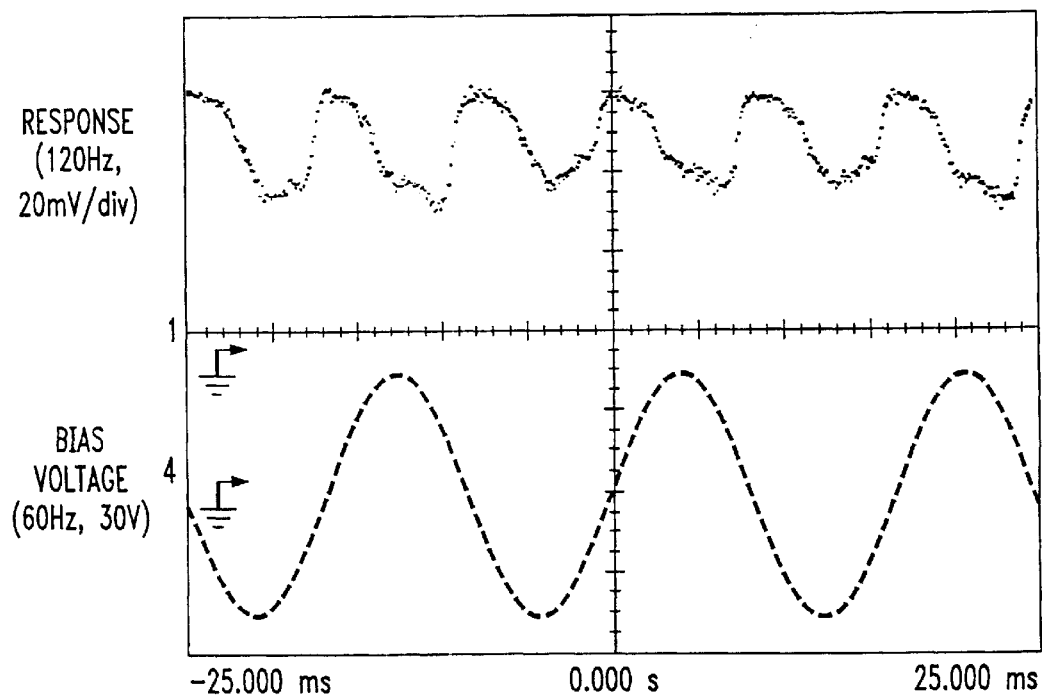
Figure 8:
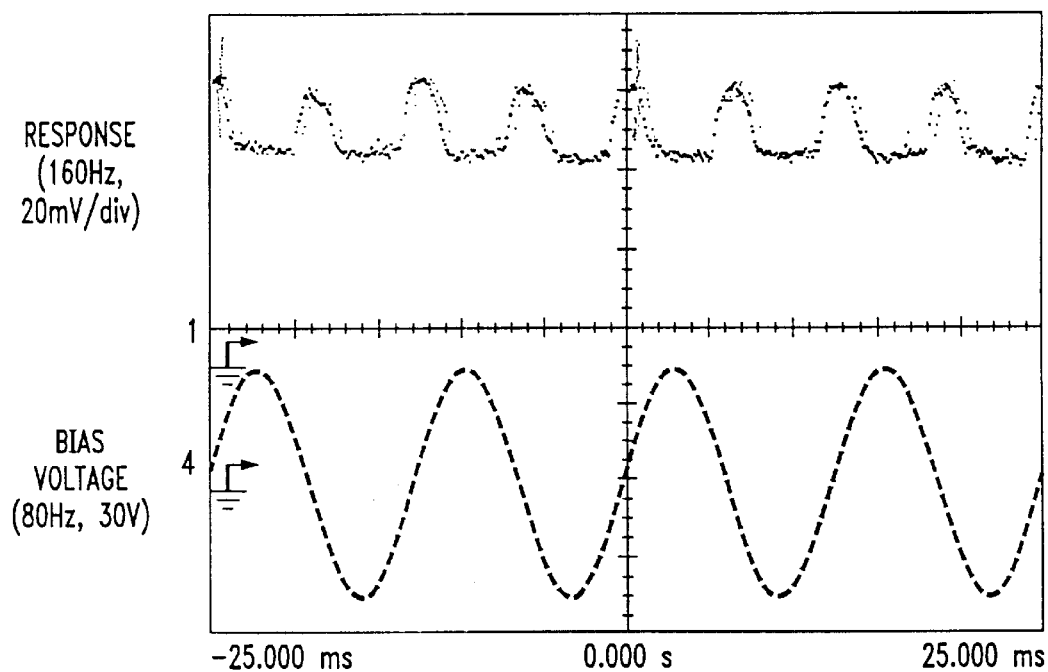

On the output side of the micro-mirror optical switch, a polysilicon plate 30 is positioned at a 45° angle to both the substrate and the optical signal output from the micromirror. This polysilicon plate also is preferably a surface-micromachined polysilicon. The polysilicon plate may be fixed to the substrate in the 45° position by any suitable means. For example, as shown in FIG. 5, the polysilicon plate may include appropriate vertical and side supports to ensure the fixing of the position of the polysilicon plate.

The polysilicon plate functions as a beam splitter. A portion of the optical signal output from the micro-mirror is reflected by the polysilicon plate beam splitter to a photodetector located under the polysilicon plate and upon the substrate. This is illustrated in FIG. 1. The beam splitter/photodetector monitor module is shown in FIG. 5. The beam splitter may be formed of any suitable material, polysilicon merely being an illustrative example.

The photodetector is preferably formed by, for example, hybrid-integrating the photodetector into the system by wire bonding as explained in L. Y. Lin, L. M. Lunardi and E. L. Goldstein, "Optical Cross-Connect Integrated System (OCCIS): A Free-Space Micromachined Module For Signal And Switching Configuration Monitoring", IEEE LEOS Summer Topical Meeting: Optical MEMS, Monterey, Calif., Jul. 20–22, 1998, incorporated by reference herein in its entirety. In particular, the photodetector may be solder mounted on the substrate of the free-space micro-mirror chip.

Small angular variations of the micro-mirror as a result of the dithering signal applied to the electrode plate are transformed into intensity modulation of the detected optical from the photodetector. Due to the high angular sensitivity of single-mode optics, the resulting modulation efficiency is quite high. By modulating the angle of the actuated micromirror with various frequencies, a pilot-tone signal carrying the connection-path information can therefore be impressed on the optical signal.

In other words, the dithering of the micro-mirror results in a detectable variation in the intensity of the optical beam arriving at the photodetector from the polysilicon plate beam splitter. The detection of this variation by the photodetector can verify that the switching of the optical beam within the MEMS OXC occurred successfully. If an input optical signal is desired to be sent to a selected output port, verification of the switching to that output port can be done in this scheme. If variation in the intensity of a pilot tone sent from the input port is registered at the photodetector associated with the optical switching element feeding the selected output port, then the necessary switching is properly occurring.

To measure the bandwidth and sensitivity of the hinged micro-mirrors, sinusoidal signals with various frequencies and amplitudes are applied to the electrode. The modulated output electrical signal from the photodetector is then captured by an oscilloscope. FIGS. 6–9 show the frequency response of the micro-mirror at 4, 120, 160 and 200 Hz, respectively under 30 V bias. The upper traces represent signals from the photodetector; the lower traces represent biases on the electrode.

Figure 9:
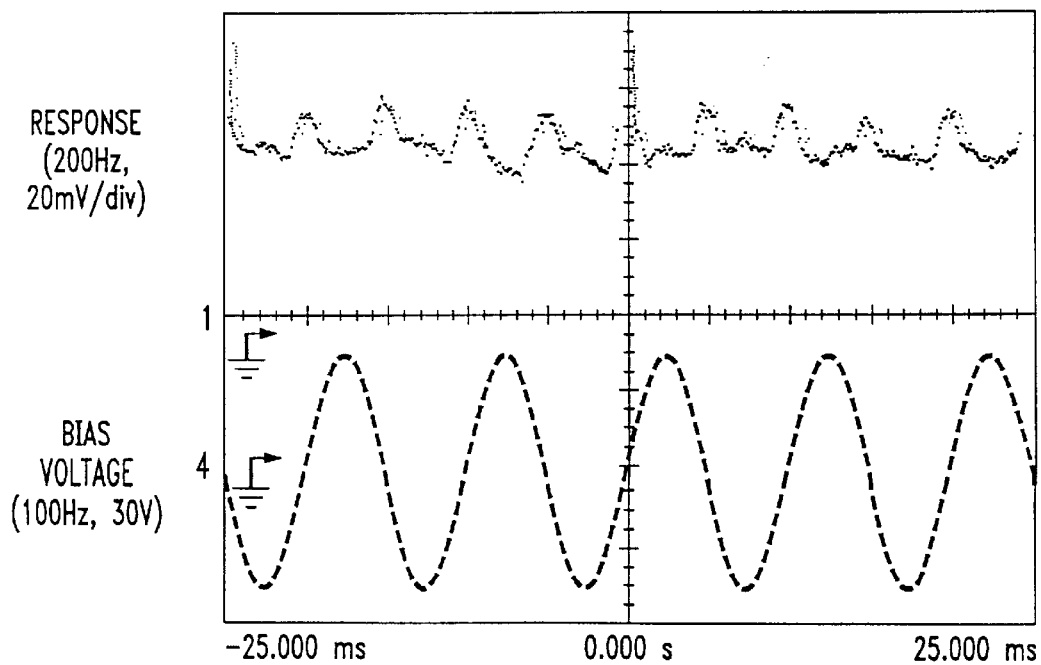

Various frequency responses between 4 and 200 Hz have been measured. The intensity-modulation frequency of signals from the photodetector is twice the bias frequency, as the mirror-angle is optimized when there is no bias. The responses remain similar between 4 and 120 Hz, and start to decrease as the frequency rises above 120 Hz. At 200 Hz, the response begins to show signs of more complex coupling into the micromechanical structure, as shown in FIG. 9. Thus, the frequency applied to the electrode plate is preferably kept between 4 and 200 Hz, most preferably between 4 and 120 Hz for the current micro-mirror. The bandwidth can be increased by modifying the design of the micromirror.

Figure 10:
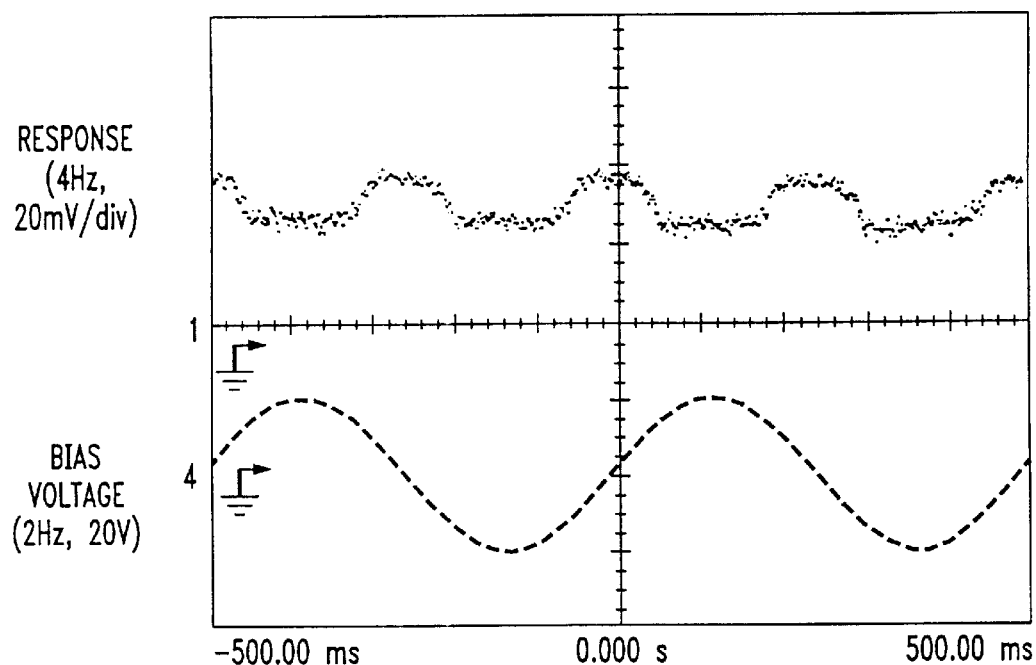
FIGS. 10–12 are frequency responses of the micro-mirror at various biases, the upper traces representing signals from the photodetector, the lower traces representing biases on the electrode.
Figure 11:
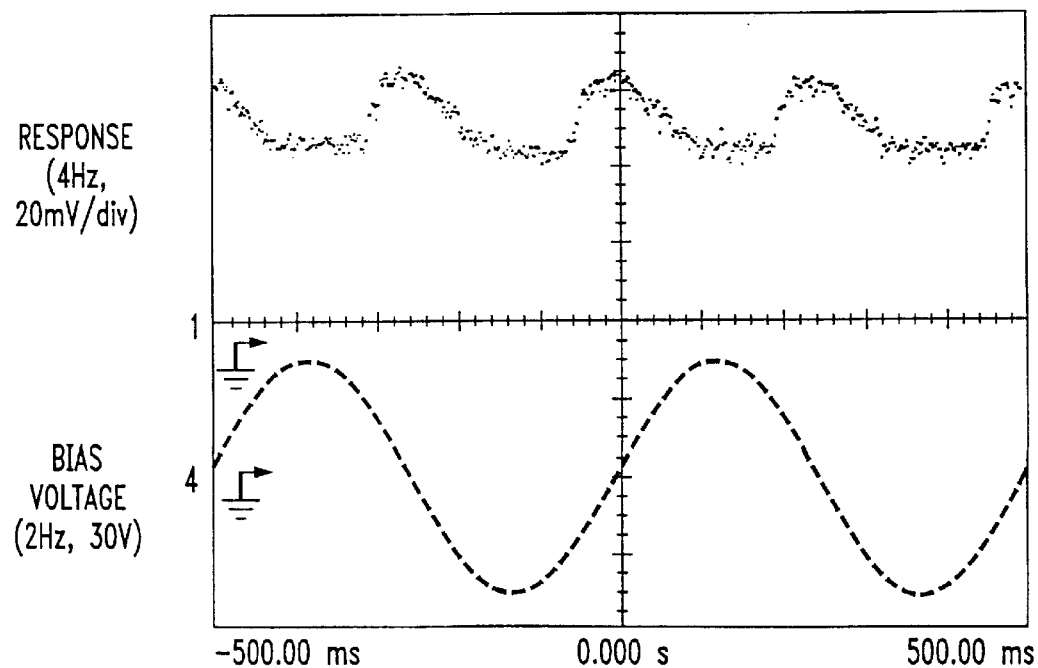
Figure 12:
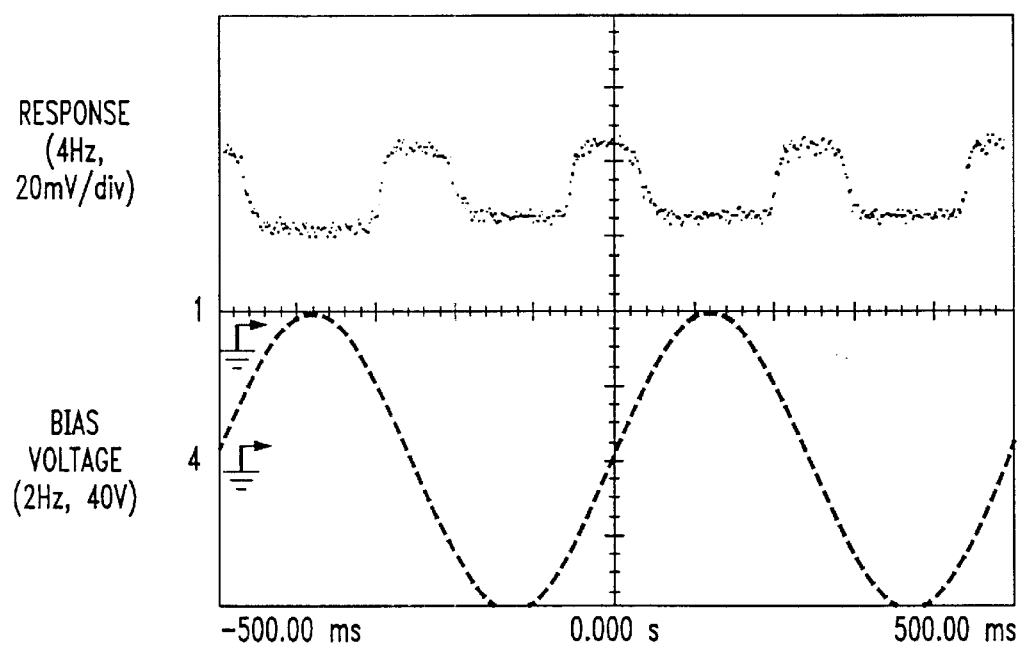

The responses of the micro-mirror under various bias amplitudes are also measured. FIGS. 10 to 12 show the results of 20 V, 30 V and 40V biases, respectively. The results may suggest that the maximum angular variation of the micro-mirror is restricted by its mechanical structure. The bias amplitude is preferably maintained between 10 and 50 V, most preferably between 20 and 40 V for the current micro-mirror.

In all cases, the intensity variation of the optical signal at the output of the switch fabric is expected to permit acceptable monitoring performance without imposing bit errors in transponder-based WDM networks.

A pilot-tone-based encoding scheme in free-space MEMS-based optical crossconnects is thus achieved. The scheme utilizes free-rotating switch mirrors with dither electrode plates and integrated micro-optics. Through this scheme, connection verification within the MEMS OXC can be readily and cost-effectively achieved.

What is claimed is:

1. A connection verification system comprising a micro-mirror having an optical signal input side and an optical signal output side, the micro-mirror connected to a substrate, an electrode plate in association with the micro-mirror and capable of dithering the micro-mirror upon application of a dithering signal to the electrode plate, a beam splitter located on the substrate at the optical signal output side of the micro-mirror, and a photodetector positioned beneath the beam splitter.

2. The connection verification system according to claim 1, wherein the system is within an optical micro-electro-mechanical crossconnect device.

3. The connection verification system according to claim 2, wherein the optical micro-electro-mechanical crossconnect device includes at least one input port and at least one output port, the micro-mirror being located on the substrate in a line of travel of an incoming optical signal from one of the at least one input ports and at a point of intersection of a path from the one input port and one of the at least one output ports when in a reflective position.

4. The connection verification system according to claim 1, wherein the electrode plate is connected to a source of the dithering signal via conductive wiring.

5. The connection verification system according to claim 1, wherein the micro-mirror is connected to the substrate via hinge joints permitting free rotation of the micro-mirror.

6. The connection verification system according to claim 1, wherein one or more of the micro-mirror, the electrode plate and the beam splitter are comprised of a surface-micromachined polysilicon.

7. A connection verification system of an optical micro-electro-mechanical crossconnect device, comprising
at least one input port and at least one output port,
a micro-mirror for one of the at least one input ports and having an optical signal input side and an optical signal output side, the micro-mirror connected to a substrate, and capable of being moved to a reflective position so as to switch an incoming optical signal from the one input port to a predetermined output port when the micro-mirror is in a reflective position,
an electrode plate in association with the micro-mirror and capable of dithering the micro-mirror upon application of a dithering signal to the electrode plate,
a beam splitter located on the substrate at the optical signal output side of the micro-mirror, and
a photodetector positioned beneath the beam splitter.

8. A method of verifying the connection path of an optical signal from an input port to a desired output port, comprising
switching an optical signal from the input port to the desired output port with a micro-mirror having an optical signal input side and an optical signal output side, the micro-mirror connected to a substrate,
applying a dithering signal to an electrode plate in association with the micro-mirror to dither the micro-mirror, and
splitting the optical signal on the optical signal output side of the micro-mirror into a detection portion and an output portion with a beam splitter located on the substrate at the optical signal output side of the micro-mirror, the beam splitter directing the detection portion to a photodetector located beneath the beam splitter.

9. The method according to claim 8, wherein the dithering signal is a sinusoidal bias.

10. The method according to claim 8, wherein the connection path is verified when the photodetector detects alterations in intensity of the detection portion of the optical beam corresponding to the dithering signal applied to the electrode plate.

11. The method according to claim 8, wherein the optical signal from the input port includes a pilot tone.

* * * * *